(12) United States Patent
Schneider

(10) Patent No.: US 8,966,594 B2
(45) Date of Patent: Feb. 24, 2015

(54) PROXY AUTHENTICATION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1341 days.

(21) Appl. No.: 12/012,621

(22) Filed: Feb. 4, 2008

(65) Prior Publication Data

US 2009/0199276 A1 Aug. 6, 2009

(51) Int. Cl.
*H04L 9/32* (2006.01)
*H04L 29/06* (2006.01)

(52) U.S. Cl.
CPC ........ *H04L 63/0815* (2013.01); *H04L 63/0884* (2013.01)
USPC .......... 726/5; 726/3; 726/11; 726/12; 709/227

(58) Field of Classification Search
USPC .................... 726/8, 10, 12, 5, 3, 11; 709/227
See application file for complete search history.

(56) References Cited

U.S. PATENT DOCUMENTS

| 7,356,694 | B2 * | 4/2008 | Mayo et al. | 713/159 |
|---|---|---|---|---|
| 7,594,112 | B2 * | 9/2009 | Patrick et al. | 713/166 |
| 7,634,803 | B2 * | 12/2009 | Birk et al. | 726/8 |
| 2004/0010714 | A1 * | 1/2004 | Stewart | 713/201 |
| 2005/0132222 | A1 * | 6/2005 | Petrovic | 713/201 |
| 2006/0015358 | A1 * | 1/2006 | Chua | 705/1 |
| 2006/0041933 | A1 * | 2/2006 | Yakov et al. | 726/8 |
| 2006/0070114 | A1 * | 3/2006 | Wood et al. | 726/2 |
| 2010/0024013 | A1 * | 1/2010 | Cheng et al. | 726/5 |

OTHER PUBLICATIONS

"JavaScript Cookies" by CSGNETWORK (confirmed Oct. 21, 2007; potential Jan. 5, 2006); 2 pages; converted to PDF from http://www.csgnetwork.com/directcookiesinfo.html via http://www.archive.org/.*
"Kerberos Authentication Protocol" by Fulvio Ricciardi (Jan. 4, 2007); 1 page; converted to PDF from http://www.zeroshell.net/eng/kerberos/Kerberos-cross-authentication/ via http://www.archive.org/.*
"Cookies across multiple Domains (PHP?)" (May 5, 2004) by WebHosting TALK; 2 pages; converted to PDF originally from http://www.webhostingtalk.com/archive/index.php/t-268375.html.*
"Login on the Web" by Nick Kew (1997); 4 pages; converted to PDF originally from http://www.webthing.com/tutorials/login.html.*
"Open-source Single Sign-On with CAS (Central Authentication Service)" by Pascal Aubry, Vincent Mathieu & Julien Marchal (2004); 30 pages; originally downloaded from http://www.immagic.com/eLibrary/ARCHIVES/GENERAL/ESUP_FR/E040427M.pdf.*
"How do you create a browser cookie that persists to a different domain?" (Mar 6, 2003) by jGuru; 3 pages; converted to PDF originally from http://www.jguru.com/faq/view.jsp?EID=1063895.*

(Continued)

*Primary Examiner* — Mohammad A Siddiqi
(74) *Attorney, Agent, or Firm* — Lowenstein Sandler LLP

(57) ABSTRACT

A first application that is hosted by a first machine receives a login request from a user. The first application requests authentication verification from a second application that is hosted by a second machine. The first application authenticates the user if the user was authenticated by the second application, wherein the user can be authenticated by both the first application and the second application after having provided authentication credentials to one of the first application or the second application.

18 Claims, 9 Drawing Sheets

(56) References Cited

OTHER PUBLICATIONS

"MSN Cookie Data Crosses Domains" (Sep. 3, 2000) by PC Help; 3 pages; converted to PDF originally from http://www.pc-help.org/privacy/ms_guid.htm.*

"Using CAS with legacy Lotus Domino application?" (Jan 16, 2008) by Palle and John Thiltges; 1 page; originally converted to PDF from http://jasig.275507.n4.nabble.com/Using-CAS-with-legacy-Lotus-Domino-application-td260433.html.*

* cited by examiner

PROXY AUTHENTICATION

TECHNICAL FIELD

Embodiments of the present invention relate to authentication mechanisms for network devices, and more specifically to authentication proxies in a networked environment.

BACKGROUND

Networked computers are used to transmit and fetch information to and from local sources (e.g., computers used in a business) and remote sources (e.g., enterprise services offered over the internet). To ensure privacy and security during communication between networked computers, authentication and verification mechanisms are commonly used.

Conventional network architectures often include multiple service providers and/or web applications that provide sensitive information. Each service provider and/or web application typically has an independent authentication mechanism. Therefore, if a client attempts access to a second service provider after providing credentials and authenticating itself to a first service provider, that client must repeat the authentication process with the second service provider. Conventional network architectures also may include network appliances (e.g., storage servers, network monitors, gateways, etc.). Each network appliance typically also has an independent authentication mechanism. Therefore, a user may be required to separately provide first credentials to the network appliance for login, and provide second credentials to a web application for login.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1A:
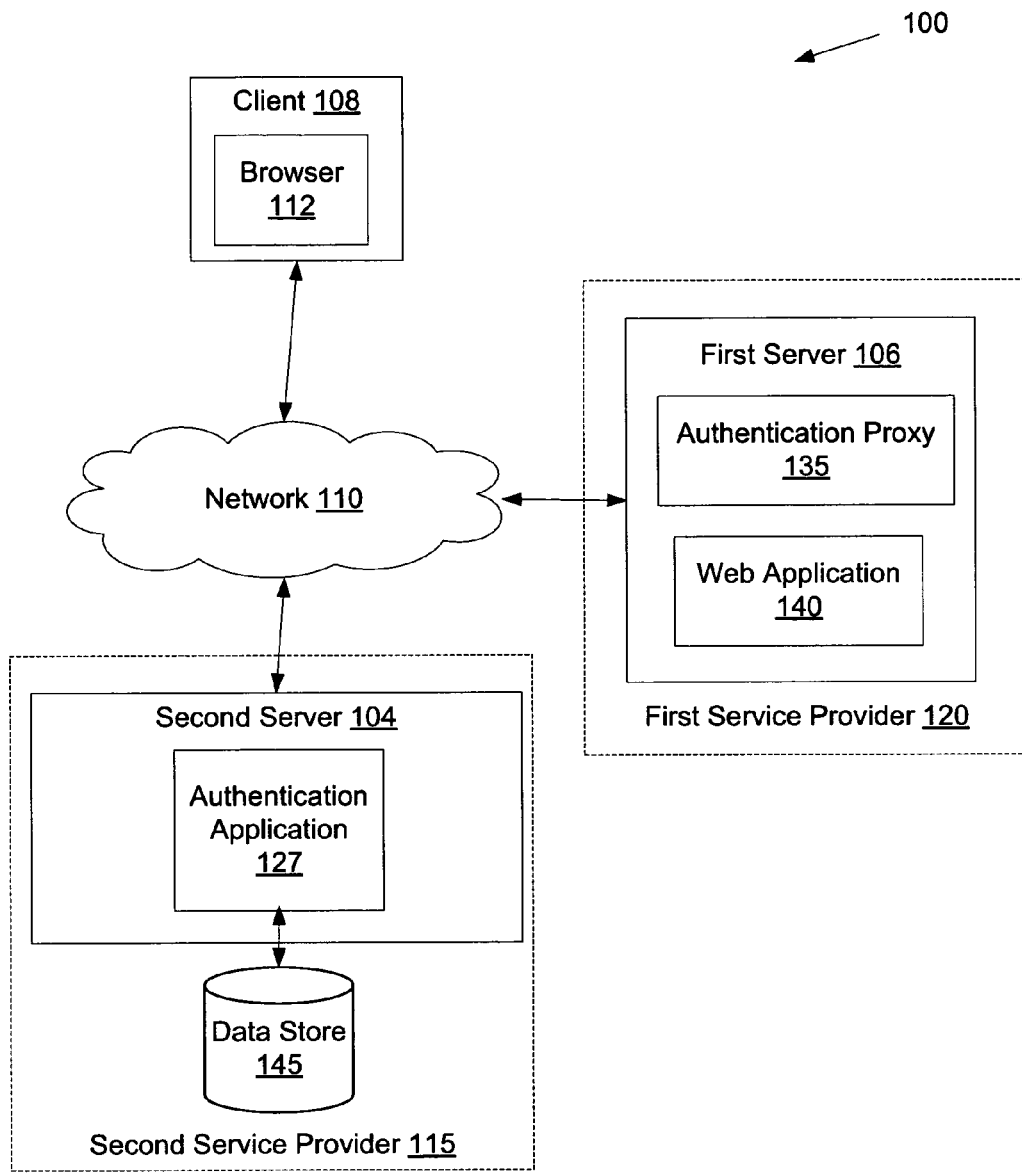
FIG. 1A illustrates an exemplary network architecture in which embodiments of the present invention may operate.

Described herein is a method and system for authenticating a user using an authentication proxy. In one embodiment, a first application receives a login request from a user. The login request may be received via a console, or from a client via a network connection. The first application requests authentication verification from a second application. The first application may be hosted by a first machine and the second application may be hosted by a second machine. The first application authenticates the user if the user was authenticated by the second application. The user can be authenticated by both the first application and the second application after having provided authentication credentials to one of the first application or the second application. In one embodiment, authentication credentials are received by the first application and forwarded to the second application for authentication. In another embodiment, authentication credentials are provided directly to the second application by a client.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "forwarding", "authenticating", "transmitting", "calling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1A illustrates an exemplary network architecture 100 in which embodiments of the present invention may operate. The network architecture 100 may include a first server 106 operated by a first service provider 120, a second server 104 operated by a second service provider 115, and a client 108 connected via a network 110, which may be a private network (e.g., a local area network (LAN), wide area network (WAN), intranet, etc.) or a public network (e.g., the internet).

Client 108 may be a computing device such as, for example, a desktop computer, laptop computer, server, cellular phone, personal digital assistant (PDA), etc. In one embodiment, client 108 includes a browser 112 (e.g., a web browser) that enables client 108 to access information maintained by, and use services provided by, first server 106 and second server 104. Browser 112 is an application that enables client 108 to display and interact with text, images, and other information provided by servers. Browser 112 may be a web browser configured to display web pages (e.g., by using hypertext transfer protocol (HTTP), extended markup language (XML), javascript, etc.).

First service provider 120 and second service provider 115 each provide one or more services (e.g., database services, systems management services, network monitoring services, transactional services, etc.) to client 108. First service provider 120 includes a first server 106 hosted by a first machine. Second service provider 115 includes a second server 104 hosted by a second machine. First server 106 and second server 104 may be front end servers (e.g., that provide an interface to client 108) and/or back end servers. Through the first server 106 and second server 104, users of client 108 may request data, initiate actions, receive information, etc. In one embodiment, first server 106 and second server 104 are web application servers that provide a web application interface accessible to client 108 via browser 112.

First server 106 includes a web application 140 to provide services and/or information to client 108. Web application 140 may require authentication from client 108 before providing services and/or information. Authentication can be established based on authentication credentials such as a login password, user ID, one time password (OTP), security token, security domain, biometric information, or other credentials.

In one embodiment, first server 106 includes an authentication proxy 135 that handles client authentication for web application 140. Authentication proxy 135 can be called (e.g., instantiated) by web application 140 to provide authentication capabilities. In one embodiment, authentication proxy 135 includes a high-level API that integrates one or more low-level authentication schemes to allow for programs that rely on authentication to be designed and written independently of an underlying authentication scheme. An example of such an authentication proxy is a pluggable authentication module (PAM) used in Linux systems. In one embodiment, web application 140 does not have any authentication capabilities, and instead relies on authentication proxy 135 for authenticating clients.

In one embodiment, authentication proxy 135 delegates authentication to second server 104 (e.g., by forwarding authentication credentials to second server 104 along with an authentication request and/or by redirecting a client to second server 104). Accordingly, if second server 104 indicates to authentication proxy 135 that client 108 should be authenticated, then authentication proxy 135 sends an authenticate message to web application 140. Upon receiving such an authenticate message, web application 140 may safely grant access and/or provide services to client 108 based on the authentication provided by second server 104.

In one embodiment, second server 104 includes an authentication application 127. Authentication application 127 determines whether or not to authenticate clients based upon received authentication credentials. Authentication credentials may include a username, user password, one-time password (OTP), certificate, organization ID, etc. If the authentication credentials match stored authentication information (e.g., as stored in data store 145), authentication application 127 can authenticate client 108 and send an authenticate message to a client 108 or application (e.g., browser 112) that requested authentication. If the authentication credentials fail authentication, authentication application 127 may send a failed authentication message to the client 108 or application that requested authentication.

In one embodiment, second server 104 is connected with a data store 145. Data store 145 may include one or more storage devices that are local to second server 104 and/or remote from second server 104. The data store 145 may manage data via a file system, database, or other data management configuration. Data store 145 may maintain a record of all sessions (active and/or expired) that have been generated by second server 104. Thereby, whenever second server 104 receives a request for information from client 108 or first server 106, second server 104 can compare received session tokens and/or session identifiers against active sessions maintained by data store 145 to determine whether client 108 is associated with an active session. Data store 145 may also maintain records of client accounts. Such records may include authentication credentials (or hashes of authentication credentials) for comparison against authentication credentials that are provided by client 108 and/or first server 106 to determine whether or not to authenticate client 108.

Figure 1B:
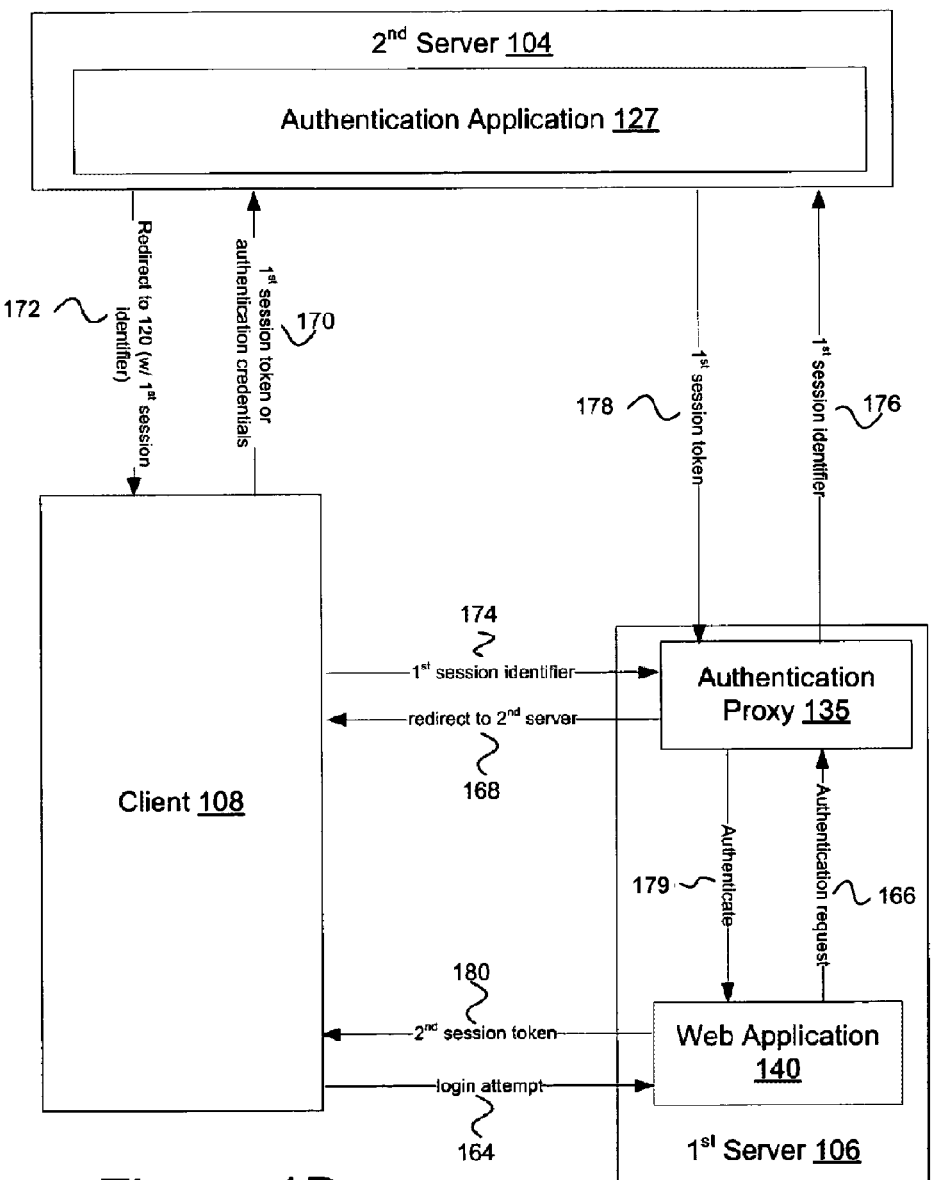
FIG. 1B illustrates a data flow diagram that shows data transmitted between a client, a first server and a second server, in accordance with one embodiment of the present invention.

FIG. 1B illustrates a data flow diagram 160 that shows data transmitted between a client 108, a first server 106 and a second server 104, in accordance with one embodiment of the present invention. In one embodiment, all transmissions are achieved using a secure channel such as, for example, secure sockets layer (SSL), secure hypertext transfer protocol (HTTPS), etc. Alternatively, an unsecure channel may be used for some or all transmissions. For example, a session identifier may be transmitted via an unsecure channel.

In a first transmission 164, client 108 sends a user request to login to web application 140 of first server 106. The first transmission 164 may or may not include one or more authentication credentials. Upon receiving the first transmission 164, web application 140 may call authentication proxy 135, and send a second transmission 166 that includes an authentication request to authentication proxy 135. The second transmission 166 may also include any received authentication credentials.

Authentication proxy 135 may be configured to delegate all authentication responsibility to second server 104. Therefore, whenever a request to authenticate is received, the requestor (e.g., client 108) can be redirected to second server 104. In a third transmission 168 from authentication proxy 135 to client 108, authentication proxy 135 sends a redirect that redirects client 108 to second server 104. In one embodiment, the third transmission includes authentication credentials.

In a fourth transmission 170, client 108 sends one of a first session token or authentication credentials to second server 104. In one embodiment, the fourth transmission 170 also includes an identifier that identifies first server 106. The identifier may enable second server 104 to send a redirect to direct client 108 back to first server 106. If client 108 does not have an existing session with second server 104, client 108 provides second server 104 with the authentication credentials. In one embodiment, the authentication credentials were provided in the first transmission 164, and are automatically included in fourth message 170. In another embodiment, the authentication credentials are not included in first transmission 164, and are instead provided directly from client 108 to second server 104 in fourth transmission 170. For example, the authentication credentials may be input by a user of client 108 in response to a login prompt by the second server 104.

Authentication application 127 authenticates client 108, or denies authentication, based on the provided authentication credentials. Upon successfully authenticating client 108, authentication application 127 establishes a first session between second server 104 and client 108. The first session can have a session token, and/or a session identifier that enable future messages between client 108 and second server 104 to be associated with the first session. A session identifier is a piece of data that is used in network communications to identify a session. One type of session identifier is an identification string included in a uniform resource locator (URL). A session token is a specific type of session identifier that is stored in a cookie, and provides greater security than other types of session identifiers.

If client 108 already has an existing session when fourth transmission 170 is sent, then no authentication credentials need to be supplied. Instead, client 108 may provide second server 104 with a first session token that identifies the existing first session.

In a fifth transmission 172 from authentication application 127 to client 108, authentication application 127 sends a redirect that redirects client 108 to first server 106. The fifth transmission 172 includes the first session identifier that identifies the session between client 108 and second server 104, and may also include a first session token for the first session.

In a sixth transmission 174, client 108 sends the first session identifier to authentication proxy 135. Authentication proxy 135 then sends the first session identifier to second server 104 in a seventh transmission 176. Second server 104 uses the first session identifier to identify the first session, and responds by sending the first session token 178 to authentication proxy 135 in an eighth transmission 178. In one embodiment, client 108 does not directly transmit the first session token to first server 106 because the communications protocols used (e.g., HTTP) include safeguards that prevent one server from accessing the session tokens placed on a client by another server. Therefore, first server 106 identifies the session to second server 104 using the session identifier to obtain the first session token. The first session token may notify authentication proxy 135 that client 108 successfully authenticated itself against second server 104. Authentication proxy 135 may then use the first session token to authenticate client 108 against the first server 106 and/or the web application 140.

Once client 108 has been authenticated against first server 106 and/or web application 140, authentication proxy 135 sends an authenticate message to web application 140 in a ninth transmission 179. The ninth transmission 179 may include the session token and/or session identifier.

Upon receiving the authenticate message, web application 140 establishes a second session between client 108 and first server 106 and/or web application 140. Establishment of the second session may include generating a session identifier and/or session token for the second session. In one embodiment, the first session token is encapsulated in the second session token. Alternatively, the first session token and/or first session identifier may be associated with the second session by first server 106. First server 106 may then use first session token and/or first session identifier to identify the second session. The second session token and/or second session identifier (or first session token and first session identifier) are then sent to client 108 in a tenth transmission. A message authentication code (MAC) may also be sent in the tenth transmission for increased security. Client 108 can then access information and/or services provided by web application 106 using the second session identifier, second session token, and/or MAC (or first session identifier, first session token and/or MAC).

Figure 2A:
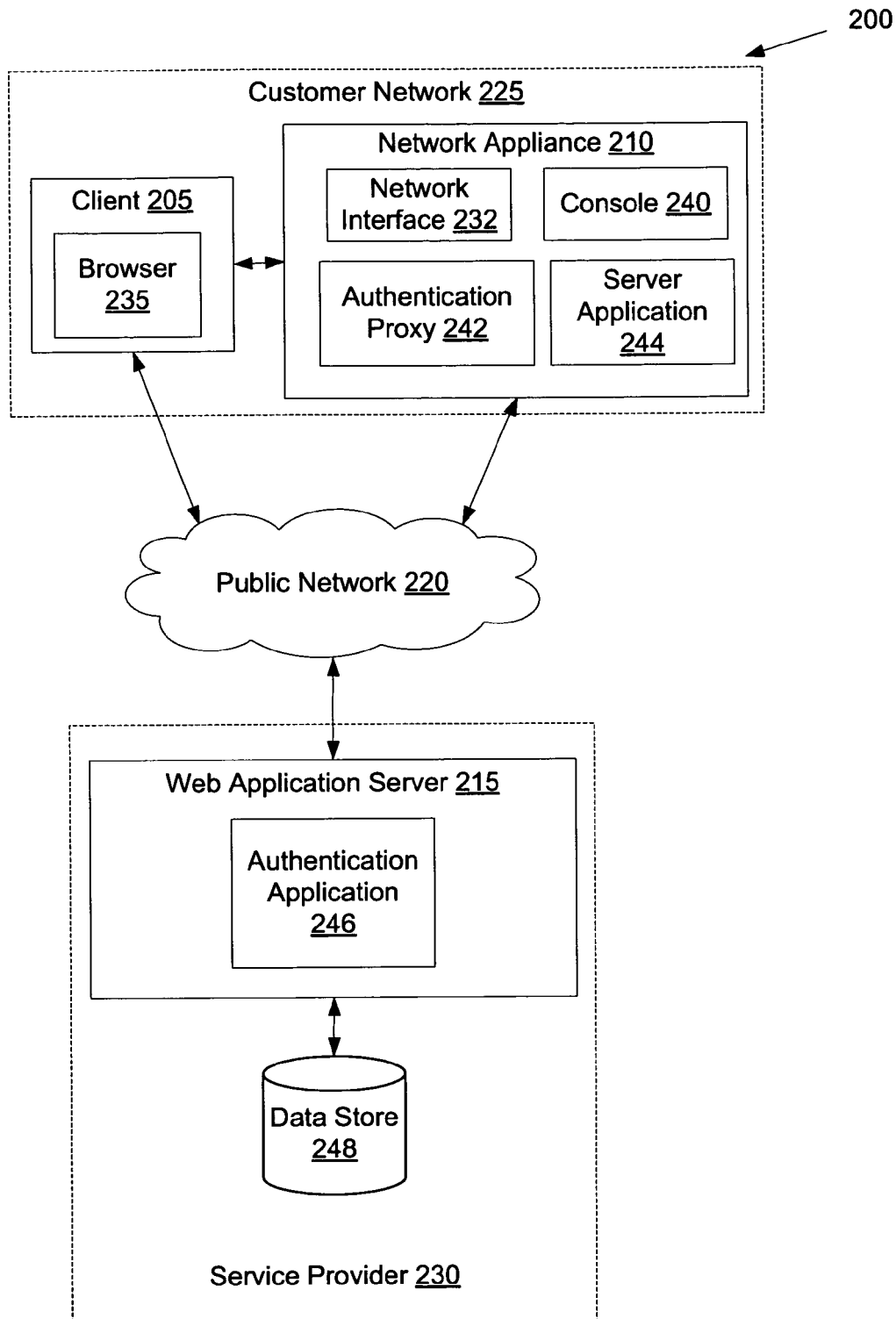
FIG. 2A illustrates another exemplary network architecture in which embodiments of the present invention may operate.

FIG. 2A illustrates another exemplary network architecture 200 in which embodiments of the present invention may operate. The network architecture 200 may include a service provider 230 connected with a customer network 225 (e.g., a local area network (LAN), wide area network (WAN), intranet, etc.) over a public network 220 (e.g., the internet). Alternatively, the customer network 225 may be connected with the service provider 230 via a private network (e.g., an intranet, virtual private network (VPN), etc.).

Network architecture 200 may enable service provider 230 to provide services targeted to, and/or dependent on, specific devices (e.g., network appliance 210) of customer network 225. Before such services are provided, it may be necessary for the specific device and/or a client 205 or user of the specific device to authenticate itself to service provider 230.

Customer network 225 may represent a network of an enterprise, and may include such devices as desktop computers, laptop computers, network printers, switches, routers, gateways, firewalls, or any other devices having a network address. In one embodiment, the customer network 225 also includes a client 205 and a network appliance 210. In other embodiments, the customer network 225 may include different combinations of clients, network appliances, switches, routers, gateways, etc.

The client 205 and the network appliance 210 may each be a computing device (machine) such as, for example, a desktop computer, laptop computer, server, etc. Client 205 may be a device operated by an IT administrator or some other user. In one embodiment, client 205 hosts a browser 235.

The network appliance 210 is a computing device (machine) that is configured to perform a network related function (e.g., network monitoring) for customer network 225. In one embodiment, the network appliance 210 is configurable over a network. In one embodiment, network appliance 210 includes server application 244 that enables client 205 to access information on network appliance via browser 235. A user (e.g., IT administrator) may be required to login to network appliance 210 to gain access to information, configuration options, etc. In one embodiment, user login can be performed for client 205 via server application 244 and a network interface 232. In another embodiment, user login can be performed for a local user via a console 240, which provides direct access to network appliance 210 via a display and input. For successful login, the user may be required to provide acceptable authentication credentials.

In one embodiment, network appliance 210 includes an authentication proxy 242 that handles client authentication for network appliance 210. Authentication proxy 242 can be called (e.g., instantiated) by console 240 and/or server application 244 to provide authentication capabilities. Upon calling authentication proxy 242, console 240 or server application 244 pass authentication credentials thereto. Authentication proxy 135 can then forward the authentication credentials to web application server 215 along with a request to authenticate the credentials. Web application server 215 may then respond with an authenticate message or an authentication failure message. Upon receiving an authenticate message, authentication proxy 242 notifies console 240 and/or server application 244 that the user has been authenticated. Thereby, a console login and/or client login to network appliance 210 can be authenticated from web application server 215. Moreover, a user can supply authentication credentials only once to authenticate himself against both network appliance 210 and web application server 215.

Service provider 230 provides one or more services to customer network 225. In one embodiment, service provider 230 hosts a network and systems management and monitoring tool (NSMMT) that collects information about the customer network 225 and devices on the customer network 225, and presents this information to a user such as an IT administrator (e.g., via client 205 or console 240). Alternatively, the service provider 230 may provide other services, such as banking services, database management services, etc. The service provider 230 includes one or more servers (e.g., web application server 215).

Web application server 215 may include a front end server that provides an interface to client 205 of customer network 225. Through the web application server 215, users of customer network 225 may request data, initiate actions, receive information, etc. Network appliance 210 may also communicate with web application server 215, for example, to request a service, initiate an action, report data, request authentication, etc. Web application server 215 may also include a back end server that communicates with the network appliance 210 and/or client 205 of customer network 225 to send and/or receive such data as authentication messages, network status updates, transactions, etc.

In one embodiment, web application server 215 includes an authentication application 246. Authentication application 246 determines whether or not to authenticate client 205 and/or network appliance 210 based upon received authentication credentials (e.g., username, user password, one-time password (OTP), certificate, organization ID, etc.). If the authentication credentials match stored authentication information (e.g., as stored in data store 248), authentication application 246 can authenticate client 205 and/or network appliance 210 and send an authenticate message to network appliance 210. If the authentication credentials fail authentication, authentication application 246 may send a failed authentication message to the network appliance 210.

In one embodiment, service provider 230 includes a data store 248 that is connected with web application server 215. Data store 248 may include one or more storage devices that are local to web application server 215 and/or remote from web application server 215. The data store 248 may manage data via a file system, database, or other data management configuration. Data store 248 may maintain records of client accounts. Such records may include authentication credentials (e.g., hashes of authentication credentials) for comparison against authentication credentials that are provided by authentication proxy 242. Thereby, whenever web application server 215 receives an authentication request, web application server 215 can compare recorded authentication credentials against the stored authentication credentials to determine whether to grant authentication.

Figure 2B:
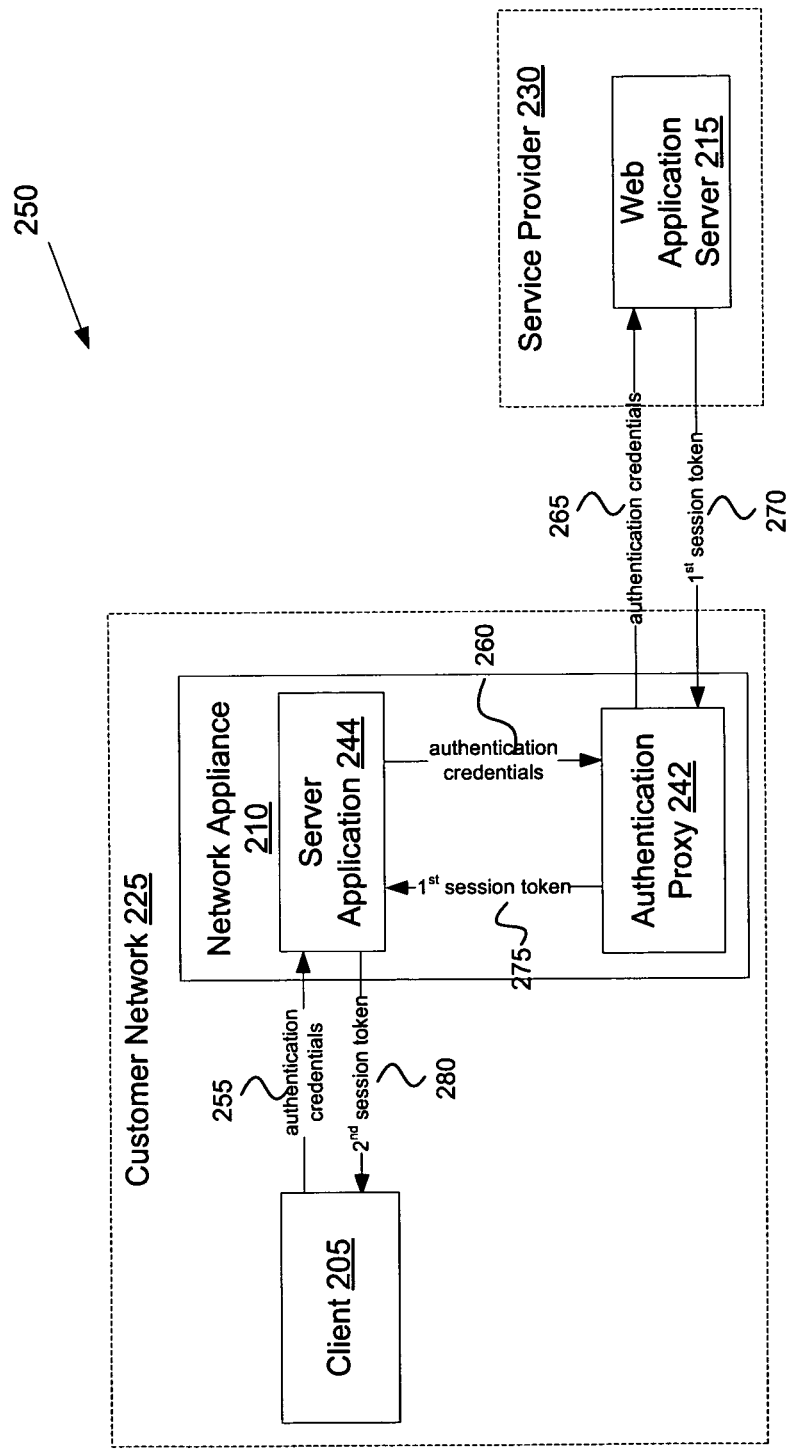
FIG. 2B illustrates a data flow diagram that shows data transmitted between a customer network and a service provider, in accordance with one embodiment of the present invention.

FIG. 2B illustrates a data flow diagram 250 that shows data transmitted between a customer network 225 and a service provider 230, in accordance with one embodiment of the present invention. In one embodiment, all transmissions are achieved using a secure channel such as, for example, secure sockets layer (SSL), secure hypertext transfer protocol (HTTPS), etc. Alternatively, an unsecure channel may be used for some or all transmissions. In one embodiment, the customer network 225 and service provider 230 correspond to customer network 225 and service provider 230 of FIG. 2A.

Referring to FIG. 2B, in a first transmission 255 client 205 attempts to login to a server application 244 of network appliance 210. The first transmission 255 may include authentication credentials (e.g., user name and password). Server application 244 may call an authentication proxy 242 to perform authentication. In a second transmission 260, server application 244 may then send the authentication credentials to authentication proxy 242.

Authentication proxy 242 can be configured to delegate authentication responsibility to service provider 230. Accordingly, in a third transmission 265, authentication proxy 242 may send the authentication credentials to web application server 215 along with a request to perform authentication on the authentication credentials.

Web application server 215 then attempts to authenticate the authentication credentials. If the authentication is successful, web application server 215 generates a first session with network appliance 210. The first session may include a first session identifier and/or a first session token. In a fourth transmission 270, web application server 215 sends the first session token and/or first session identifier to authentication proxy 242. A first message authentication code (MAC) may also be included in the fourth transmission 270 to increase security of the first session.

The first session token and/or first session identifier may notify authentication proxy 242 that client 205 successfully authenticated itself against web application server 215. The first session token and/or first session identifier also identify that network appliance 210 is authenticated against web application server 215. Authentication proxy 242 may then use the first session token to authenticate client 205 against network appliance 210.

Once client 205 has been authenticated against network appliance 210, authentication proxy 242 sends an authenticate message to server application 244 in a fifth transmission 275. The fifth transmission 275 may include the first session token, first session identifier and/or first MAC.

Upon receiving the authenticate message, server application 244 generates a second session between client 205 and network appliance 210. Generation of the second session may include generating a session identifier and/or session token for the second session. In one embodiment, the first session token is encapsulated in the second session token. The second session token and/or second session identifier are then sent to client 205 in a sixth transmission 280. A second message authentication code (MAC) may also be sent in the sixth transmission 280 for increased security. Client 205 can then access information and/or services provided by network appliance 210 using the second session identifier, second session token, and/or second MAC. Client 205 can also access information and/or services provided by web application server 215 via network appliance 210 by presenting the second session token, second session identifier and/or second MAC to network appliance 210 along with a request for information. Network appliance 210 may then forward the request for access to web application server 215 using the first session token, first session identifier and/or first MAC.

Figure 2C:
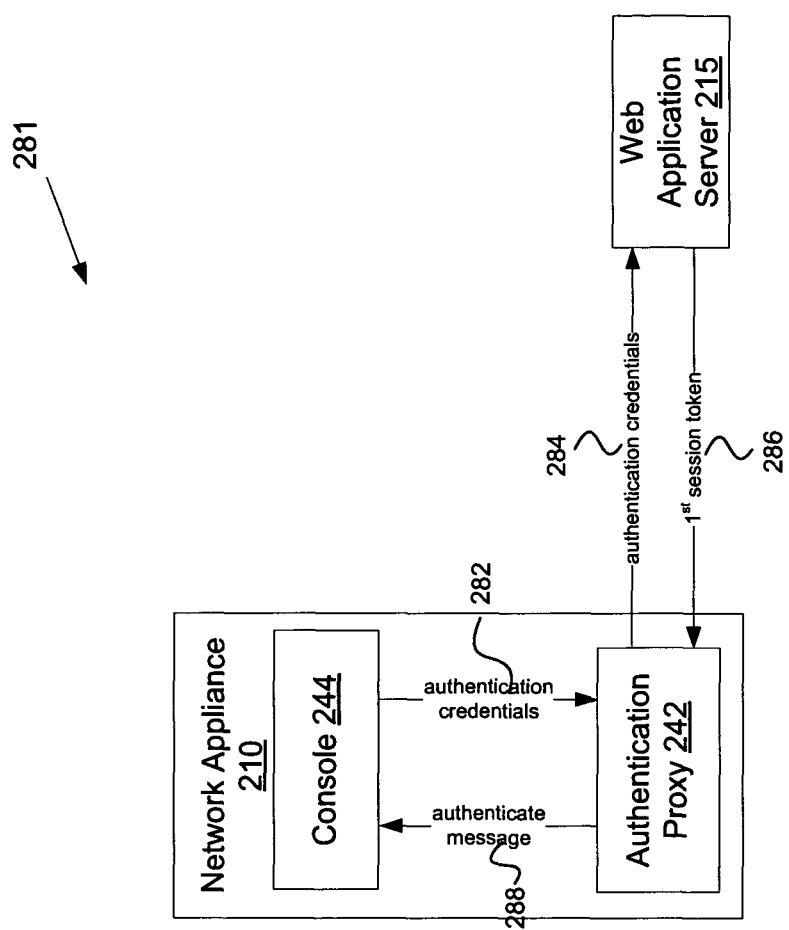
FIG. 2C illustrates a data flow diagram that shows data transmitted between network appliance and a web application server, in accordance with one embodiment of the present invention.

FIG. 2C illustrates a data flow diagram 281 that shows data transmitted between network appliance 210 and a web application server 215, in accordance with one embodiment of the present invention. In one embodiment, all transmissions are achieved using a secure channel such as, for example, secure sockets layer (SSL), secure hypertext transfer protocol (HTTPS), etc. Alternatively, an unsecure channel may be used for some or all transmissions. In one embodiment, the network appliance 210 and web application server 215 correspond to network appliance 210 and web application server 215 of FIG. 2A.

Referring to FIG. 2C, in a first transmission 282, a console 244 sends authentication credentials to an authentication proxy 242. The first transmission may be performed in response to console 244 receiving a console login request along with authentication credentials from a user, and after the authentication proxy 242 has been called.

Authentication proxy 242 can be configured to delegate authentication responsibility to web application server 215. Accordingly, in a second transmission 284, authentication proxy 242 may send the authentication credentials to web application server 215 along with a request to perform authentication on the authentication credentials.

Web application server 215 then attempts to authenticate the authentication credentials. If the authentication is successful, web application server 215 generates a first session with network appliance 210. The first session may include a first session identifier and/or a first session token. In a third transmission 286, web application server 215 sends the first session token and/or first session identifier to authentication proxy 242. A first message authentication code (MAC) may also be included in the third transmission 286 to increase security of the first session.

The first session token and/or first session identifier may notify authentication proxy 242 that the user successfully authenticated himself against the network appliance 210. The first session token and/or first session identifier also identify that network appliance 210 is authenticated against console 244. Authentication proxy 242 may then use the first session token to authenticate a client (e.g., client 205 shown in FIG. 2B) against network appliance 210.

Once the client has been authenticated against network appliance 210, authentication proxy 242 sends an authenticate message to console 244 in a fourth transmission 288. The user is then granted access to network appliance 210, and through network appliance to web application server 215.

Figure 3:
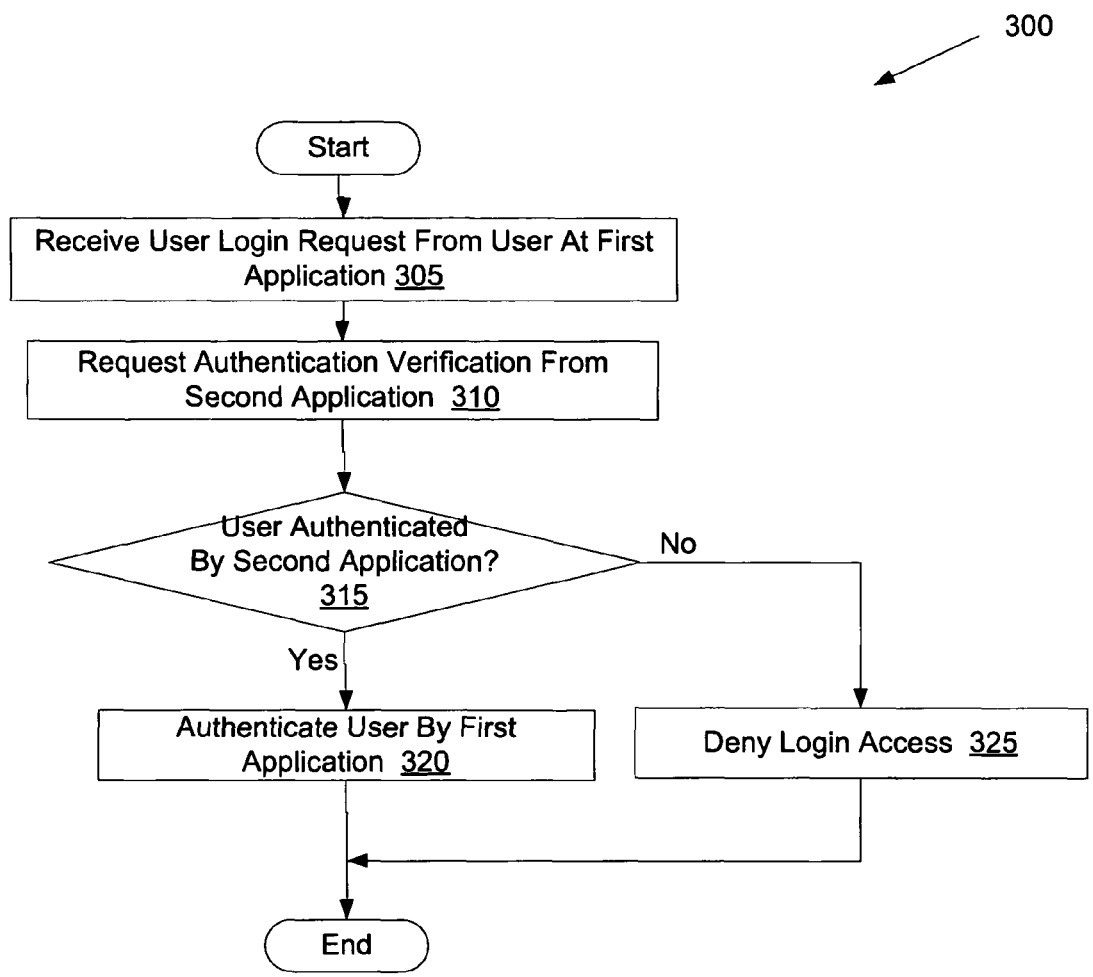
FIG. 3 is a flow diagram illustrating one embodiment of a method for authenticating a user and/or client

FIG. 3 is a flow diagram illustrating one embodiment of a method 300 for authenticating a user and/or client. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by web application 140 and/or authentication proxy 135 of FIG. 1A. In another embodiment, method 300 is performed by one or more logic components of network appliance 210 of FIG. 2A.

Referring to FIG. 3, method 300 includes processing logic receiving a login request from a user at a first application (block 305). The first application may be, for example, web application 140 of FIG. 1A, console 240 of FIG. 2A, or server application 244 of FIG. 2A. The login request may be received from a client by a server application. Alternatively, the login request may be received from the user by a console. The user login request preferably includes authentication credentials that have been provided by the user. At block 310, processing logic requests authentication verification from a second application that is remote from the first application. For example, authentication verification may be requested from a web application server.

At block 315, processing logic determines whether provided authentication credentials (and therefore the user) have been authenticated by the second application. If the user has been authenticated by the second application, the method proceeds to block 320. If the user has not been authenticated by the second application, the method proceeds to block 325.

At block 320, the first application authenticates the user, and grants login access. At block 325, the first application denies login access. The method then ends.

Figure 4:
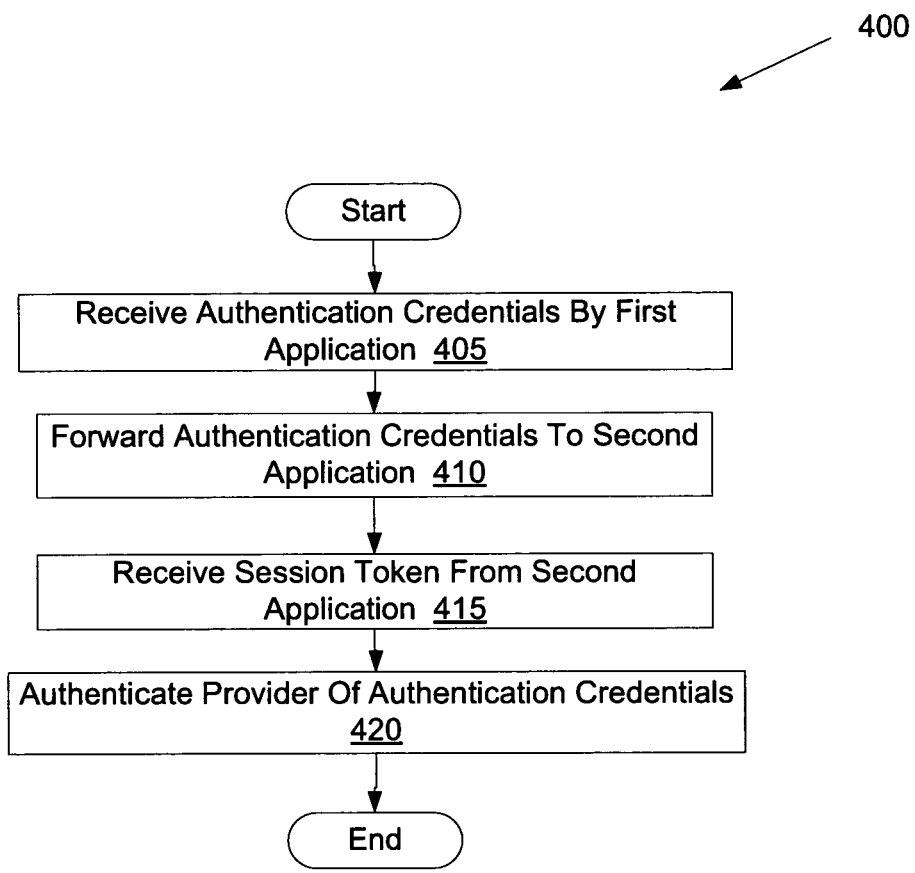
FIG. 4 is a flow diagram illustrating another embodiment of a method for authenticating a user and/or client.

FIG. 4 is a flow diagram illustrating another embodiment of a method 400 for authenticating a user and/or client. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by web application 140 and/or authentication proxy 135 of FIG. 1A. In another embodiment, method 400 is performed by one or more logic components of network appliance 210 of FIG. 2A.

Referring to FIG. 4, method 400 includes processing logic receiving authentication credentials by a first application (block 405). The first application may be, for example, web application 140 of FIG. 1A, console 240 of FIG. 2A, or server application 244 of FIG. 2A. The authentication credentials may be received from a client by a server application. Alternatively, the authentication credentials may be received from a user by a console.

At block 410, processing logic forwards the authentication credentials to a second application. The authentication credentials may be sent to the second application along with a request to authenticate the authentication credentials (and therefore the user or client that provided the authentication credentials).

At block 415, a session token is received from the second application. The second token may indicate that the authentication credentials have been authenticated against the second application. A session identifier and or a message authentication code (MAC) may also be received from the second application.

At block 420, a provider (e.g., user and/or client) of the authentication credentials is authenticated against the first application. The method then ends.

Figure 5:
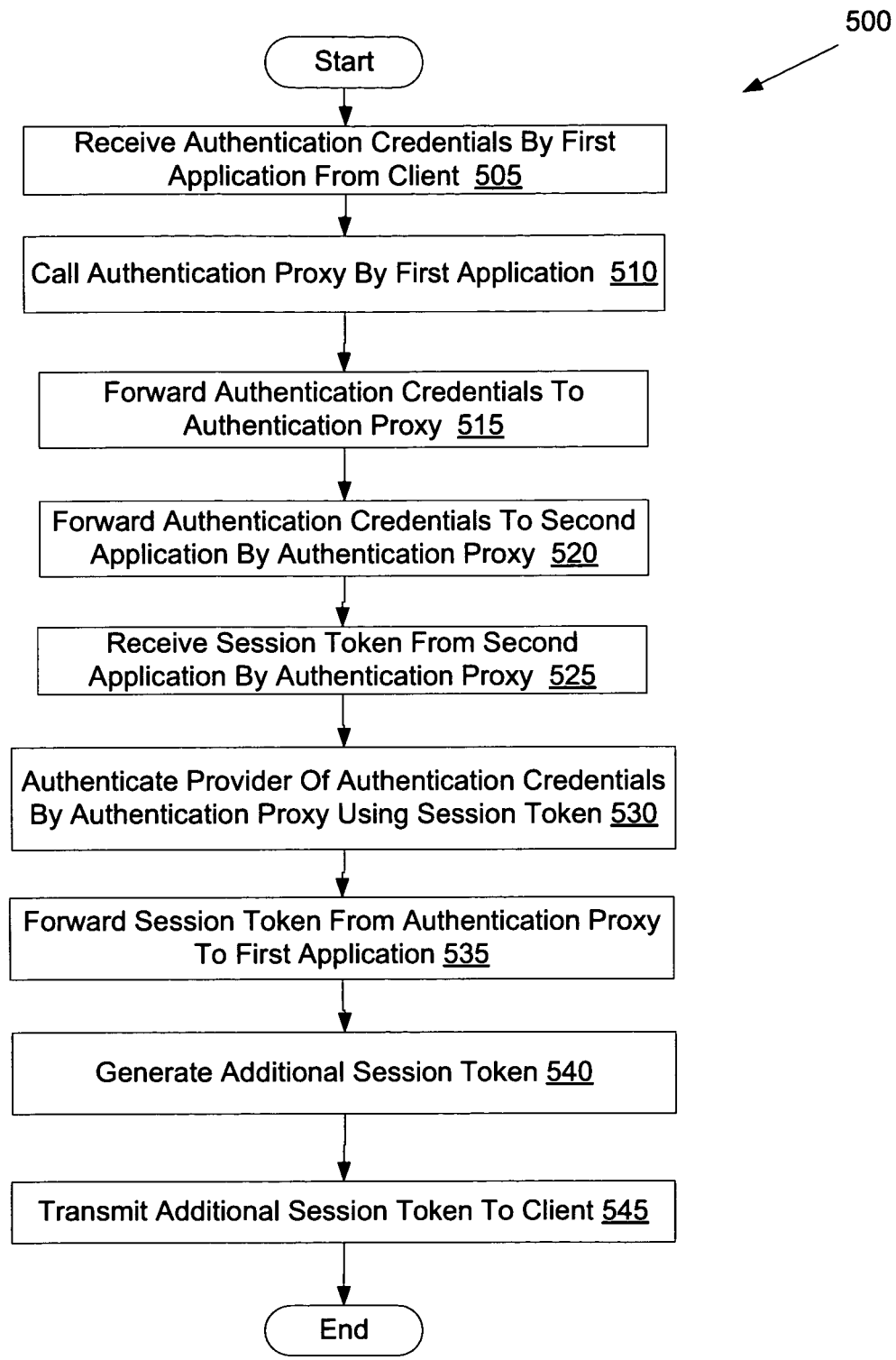
FIG. 5 is a flow diagram illustrating yet another embodiment of a method for authenticating a user and/or client.

FIG. 5 is a flow diagram illustrating yet another embodiment of a method 500 for authenticating a user and/or client. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by web application 140 and/or authentication proxy 135 of FIG. 1A. In another embodiment, method 500 is performed by one or more logic components of network appliance 210 of FIG. 2A.

Referring to FIG. 5, method 500 includes processing logic receiving authentication credentials from a client (block 505). The authentication credentials may be received by a first application that is hosted by, for example, a network appliance, web application server, etc. At block 510, the first application calls an authentication proxy (described above with reference to FIG. 1A). At block 515, first application forwards the authentication credentials to the authentication proxy.

At block 520, the authentication proxy forwards the authentication credentials to a second application that is remote from the first application (e.g., hosted by a different machine than the first application). At block 525, the authentication proxy receives a session token form the second application. The authentication may also receive a session identifier and/or a MAC from the second application.

At block 530, authentication proxy uses the session token to authenticate the provider of the authentication credentials (e.g., by accepting receipt of the session token as proof that the authentication credentials are valid). At block 535, the authentication proxy forwards the session token to the first application. At block 540, the first application generates an additional session token. Generating the additional session token may include encapsulating the first session token in the second session token. At block 545, the additional session token is transmitted to the client. The method then ends.

Figure 6:
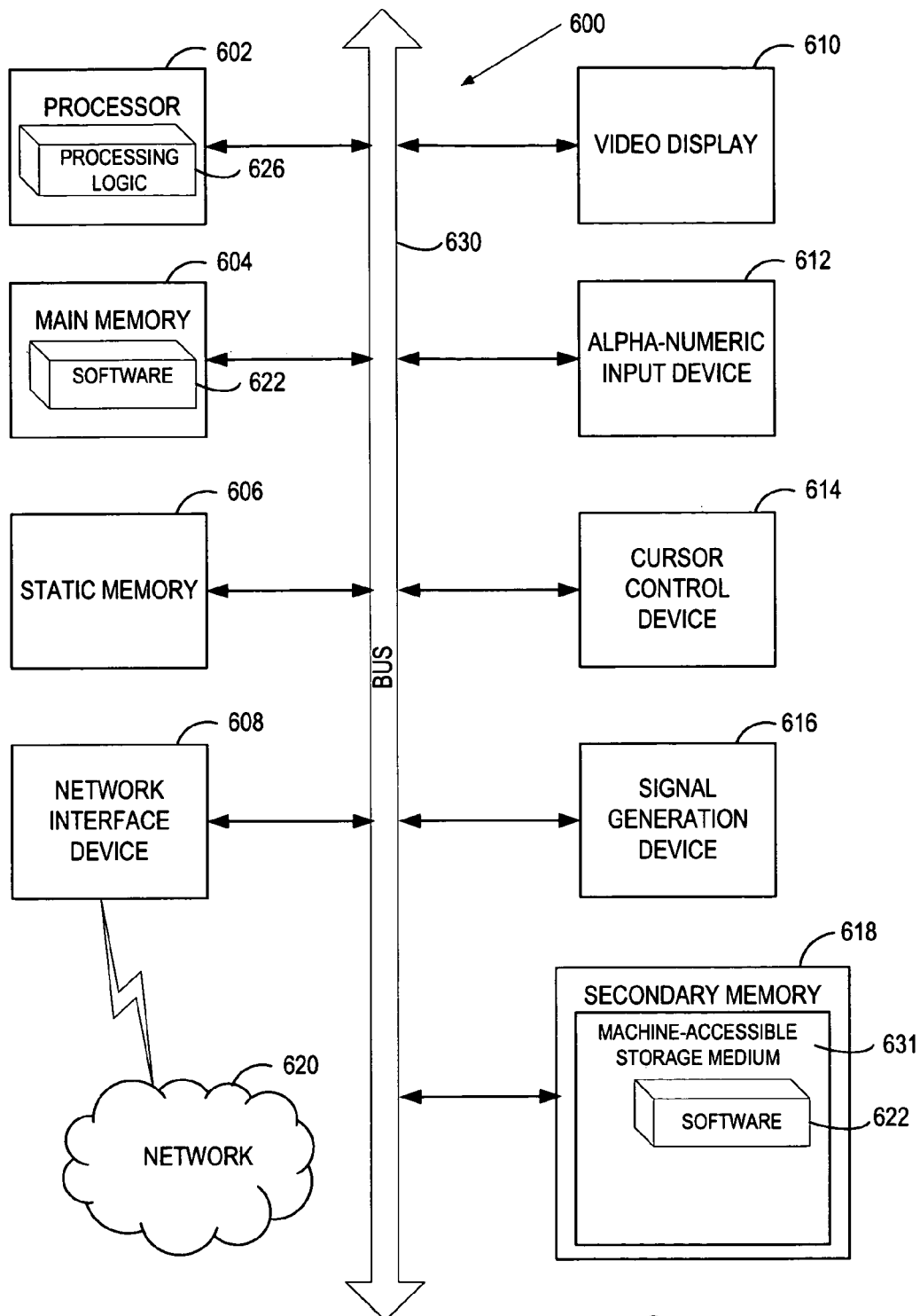
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine accessible storage medium 631 may also be used to store the authentication proxy 135, web application 140 and/or authentication application 127 of FIG. 1A, and/or a software library containing methods that call the authentication proxy 135, web application 140 and/or authentication application 127 Likewise, the machine accessible storage medium 631 may also be used to store the authentication proxy 242, server application 244 and/or authentication application 246 of FIG. 2A, and/or a software library containing methods that call such logic components. While the machine accessible storage medium 631 is shown in an exemplary embodiment to be a single medium, the term "machine accessible storage medium" should be taken to include a single medium or multiple media (e.g., a centralized or distributed database, and/or associated caches and servers) that store the one or more sets of instructions. The term "machine accessible storage medium" shall also be taken to include any medium that is capable of storing or encoding a set of instructions for execution by the machine and that cause the machine to perform any one or more of the methodologies of the present invention. The term "machine accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a pluggable authentication module (PAM) executed by a processing device, authentication credentials comprising a username and a password from a user, wherein the PAM is hosted by a first server comprising the processing device, wherein the PAM is an authentication proxy, wherein the PAM is able to receive the authentication credentials from a console at the first server and from a server application at the first server, wherein the console receives the authentication credentials from an input that is local to the first server and forwards the authentication credentials to the PAM, and wherein the server application receives the authentication credentials from a client device that is remote from the first server and forwards the authentication credentials to the PAM;
   forwarding, by the PAM, the authentication credentials to a web application via secure hypertext transfer protocol (HTTPS), wherein the web application is hosted by a second server;
   receiving, by the PAM, a first session token from the web application, wherein the first session token indicates that the authentication credentials have been authenticated by the web application; and
   providing, by the PAM, the first session token to one of the server application or the console to directly authenticate the user by the server application or the console, wherein the user is also authenticated by the web application after having provided the authentication credentials to the one of the server application or the console, and wherein the server application generates a second session token in response to receipt of the first session token and provides the second session token to the client device.

2. The method of claim 1, wherein the PAM acts as a client to the web application.

3. The method of claim 1, wherein the server application encapsulates the first session token in the second session token which represents a session between the client device and the server application.

4. The method of claim 1, wherein receiving the authentication credentials comprises receiving the authentication credentials, by the PAM, from the user via a login from the console.

5. The method of claim 1, wherein receiving the authentication credentials comprises receiving the authentication credentials, by the PAM, from the client device via a secure hypertext transfer protocol (HTTPS) request from the server application.

6. The method of claim 1, wherein the method further comprises:
   redirecting, by the PAM, the client device to the web application;
   receiving, by the PAM, a session identifier from the client device that identifies a session between the client device and the web application; and
   transmitting, by the PAM, the session identifier to the web application.

7. A system comprising:
   a memory to store instructions; and
   a processing device to execute the instructions to:
     receive, by a pluggable authentication module (PAM) executed by the processing device, authentication credentials comprising a username and a password from a user, wherein the PAM is hosted by a first server comprising the processing device, wherein the PAM is an authentication proxy, wherein the PAM is able to receive the authentication credentials from a console at the first server and from a server application at the first server, wherein the console receives the authentication credentials from an input that is local to the first server and forwards the authentication credentials to the PAM, and wherein the server application receives the authentication credentials from a client device that is remote from the first server and forwards the authentication credentials to the PAM;
     forward, by the PAM, the authentication credentials to a web application via secure hypertext transfer protocol (HTTPS), wherein the web application is hosted by a second server,
     receive, by the PAM, a first session token from the web application, wherein the first session token indicates that the authentication credentials have been authenticated by the web application, and
     provide, by the PAM, the first session token to one of the server application or the console to directly authenticate the user by the server application or the console, wherein the user is also authenticated by the web application after having provided the authentication credentials to the one of the server application or the console, and wherein the server application generates a second session token in response to receipt of the first session token and provides the second session token to the client device.

8. The system of claim 7, wherein the server application encapsulates the first session token in the second session token which represents a session between the client device and the server application.

9. The system of claim 7, wherein the processing device is to receive the authentication credentials, by the PAM, from the user via a login from the console.

10. The system of claim 7, wherein the processing device is to receive the authentication credentials, by the PAM, from the client device via a secure hypertext transfer protocol (HTTPS) request from the server application.

11. The system of claim 7, wherein the processing device is further to:
    redirect, by the PAM, the client device to the web application,
    receive, by the PAM, a session identifier from the client device that identifies a session between the client device and the web application, and
    transmit, by the PAM, the session identifier to the web application.

12. A non-transitory computer readable storage medium comprising instructions that, when executed by a processing device, cause the processing device to perform operations comprising:
    receiving, by a pluggable authentication module (PAM) executed by the processing device, authentication credentials comprising a username and a password from a user, wherein the PAM is hosted by a first server comprising the processing device, wherein the PAM is an authentication proxy, wherein the PAM is able to receive the authentication credentials from a console at the first server and from a server application at the first server, wherein the console receives the authentication credentials from an input that is local to the first server and forwards the authentication credentials to the PAM, and wherein the server application receives the authentication credentials from a client device that is remote from the first server and forwards the authentication credentials to the PAM;

forwarding, by the PAM, the authentication credentials to a web application via secure hypertext transfer protocol (HTTPS), wherein the web application is hosted by a second server;

receiving, by the PAM, a first session token from the web application, wherein the first session token indicates that the authentication credentials have been authenticated by the web application; and providing, by the PAM, the first session token to one of the server application or the console to directly authenticate the user by the server application or the console, wherein the user is also authenticated by the web application after having provided the authentication credentials to the one of the server application or the console, and wherein the server application generates a second session token in response to receipt of the first session token and provides the second session token to the client device.

13. The non-transitory computer readable storage medium of claim 12, wherein PAM acts as a client to the web application.

14. The non-transitory computer readable storage medium of claim 12, wherein the server application encapsulates the first session token in the second session token which represents a session between the client device and the server application.

15. The non-transitory computer readable storage medium of claim 12, wherein receiving the authentication credentials comprises receiving the authentication credentials, by the PAM, from the user via a login from the console.

16. The non-transitory computer readable storage medium of claim 12, wherein receiving the authentication credentials comprises receiving the authentication credentials, by the PAM, from the client device via a secure hypertext transfer protocol (HTTPS) request from the server application.

17. The non-transitory computer readable storage medium of claim 12, wherein the operations further comprise:

redirecting, by the PAM, the client device to the web application;

receiving, by the PAM, a session identifier from the client device that identifies a session between the client device and the web application; and transmitting, by the PAM, the session identifier to the web application.

18. The system of claim 7, wherein the PAM acts as a client to the web application.

* * * * *